(12) United States Patent
Hsia

(10) Patent No.: US 6,923,467 B2
(45) Date of Patent: Aug. 2, 2005

(54) STROLLER WITH CAR SEAT FASTENING ARRANGEMENT

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 10/645,230

(22) Filed: Aug. 18, 2003

(65) Prior Publication Data

US 2004/0032103 A1 Feb. 19, 2004

Related U.S. Application Data

(62) Division of application No. 10/038,201, filed on Oct. 18, 2001, now Pat. No. 6,702,316.

(51) Int. Cl.[7] ................................................. B62B 7/14
(52) U.S. Cl. .................... 280/648; 280/642; 280/47.38; 280/643; 297/256.16
(58) Field of Search ................................. 280/648, 642, 280/647, 650, 30, 47.38, 87.051, 643, 644, 657, 658, 47.41; 297/256.15, 256.16, 256.17, 47.41

(56) References Cited

U.S. PATENT DOCUMENTS

| | | | | |
|---|---|---|---|---|
| 4,921,261 A | * | 5/1990 | Sadler et al. | 280/30 |
| 4,989,888 A | * | 2/1991 | Qureshi et al. | 280/30 |
| 5,676,386 A | * | 10/1997 | Huang | 280/30 |
| 5,794,951 A | * | 8/1998 | Corley et al. | 280/30 |
| 5,947,555 A | * | 9/1999 | Welsh et al. | 297/130 |
| 6,189,914 B1 | * | 2/2001 | Worth et al. | 280/642 |
| 6,209,892 B1 | * | 4/2001 | Schaaf et al. | 280/33.993 |
| 6,241,274 B1 | * | 6/2001 | Huang | 280/642 |
| 6,286,844 B1 | * | 9/2001 | Cone et al. | 280/47.41 |
| 6,302,412 B1 | * | 10/2001 | Worth et al. | 280/30 |
| 6,331,032 B1 | * | 12/2001 | Haut et al. | 297/130 |
| 6,398,233 B1 | * | 6/2002 | Liang et al. | 280/30 |
| 6,409,205 B1 | * | 6/2002 | Bapst et al. | 280/642 |
| 6,641,164 B2 | * | 11/2003 | Wood et al. | 280/648 |
| 6,702,316 B2 | * | 3/2004 | Hsia | 280/648 |
| 2001/0040357 A1 | * | 11/2001 | Barrett et al. | 280/648 |
| 2002/0093177 A1 | * | 7/2002 | Chen | 280/647 |
| 2003/0075903 A1 | * | 4/2003 | Hsia | 280/648 |

FOREIGN PATENT DOCUMENTS

DE 0422812 A1 * 4/1991 ............. B62B/7/14

* cited by examiner

Primary Examiner—J. Allen Shriver
(74) Attorney, Agent, or Firm—Raymond Y. Chan; David and Raymond

(57) ABSTRACT

A stroller, which incorporates with a car seat fastening arrangement, includes a stroller frame for substantially supporting a car seat thereon. The car seat fastening arrangement includes a holding belt extended from the stroller frame and a connecting unit securely locked up the two ends of the holding belt to form a holding loop, having a predetermined length, for encirclingly holding the car seat on the stroller frame through the fastening slot. Therefore, the car seat is securely supported on the stroller frame and firmly fastened by the two ends of the holding belt connecting with each other through the fastening slot of the car seat.

6 Claims, 6 Drawing Sheets

STROLLER WITH CAR SEAT FASTENING ARRANGEMENT

CROSS REFERENCE OF RELATED APPLICATION

This is a Divisional Application of a non-provisional application, application Ser. No. 10/038,201, filed Oct. 18, 2001 now U.S. Pat. No. 6,702,316.

BACKGROUND OF THE PRESENT INVENTION

1. Field of Invention

The present invention relates to baby's accessories, and particularly to a stroller equipped with a car seat fastening arrangement, wherein a car seat is adapted to be securely mounted on the stroller. Therefore, the parents do not have to move the baby or young child back and forth from the car seat to the stroller and thus individually carry the car seat and the stroller at the same time.

2. Description of Related Arts

When babies grow up, their parents must purchase thousands of baby's accessories, such as childbed or playpen. Among of all the baby's accessories, a stroller and a car seat become the two necessities to every family having a young child or baby. According to rules and regulations, the car seat must be employed in every vehicle for transporting the baby or young child. Besides, the stroller is considered as a conveniences tool to carry the baby or young child during outdoor activities such as foot traveling and shopping. Therefore, the stroller and the car seat play the main role for the parents to carry their babies.

However, it is a hassle for the parent to move the baby back and forth from the car seat to the stroller. Especially when the baby falls asleep, the parent may merely wake him or her up while moving him or her from/to the car seat to/from the stroller. Once the baby wakes up, the parent may take longer time to soothe him or her back to sleep. So, most parents may merely take the baby with the car seat from the vehicle in order to carry the baby everywhere. It is unreasonable for the parent to carry the car seat as a bassinet at one hand while another hand to control the stroller. Therefore, the parent may put the car seat on the stroller so as to carry the car seat and the stroller at the same time. However, the car seat may easily flip over from the stroller and cause an unwanted injury to the soft and weak baby.

Moreover, when the parent has more than on baby, they may immediately purchase one more stroller, but it is impossible for a single parent to handle two strollers at the same time. Even an improved stroller comprising two regular seats can solve the above problem, such stroller must have a relatively large size in order to fit the two regular seats constructed therewith. The problem is that the parents may merely have difficulty to handle both the car seat and the stroller at the same time.

SUMMARY OF THE PRESENT INVENTION

A main object of the present invention is to provide a stroller with car seat fastening arrangement, wherein a car seat is capable of securely mounting on the stroller such that the parents can put the car seat in the vehicle or mount on the stroller anytime especially while the baby is sleeping.

Another object of the present invention is to provide a stroller with car seat fastening arrangement which comprises a holding belt extended from the stroller to substantially encircle the car seat, so as to prevent the car seat from flipping over from the stroller accidentally.

Another object of the present invention is to provide a stroller with car seat fastening arrangement which does not require to change the original structural design of the stroller, so as to minimize the manufacturing cost of the stroller incorporating with the car seat fastening arrangement.

Another object of the present invention is to provide a stroller with car seat fastening arrangement, wherein the fastening operation of the car seat with the is easy and fast that an individual is able to attach/detach the car seat to/from the stroller.

Another object of the present invention is to provide a stroller with car seat fastening arrangement wherein the holding belt can be adjusted its length for fittedly holding any size of the ordinary car seat. Therefore, the parent does not need to purchase a particular car seat in order to incorporate with the present invention.

Another object of the present invention is to provide a stroller with car seat fastening arrangement, wherein when the car seat is mounted on the stroller, the stroller can be formed as a double-seated stroller so as to provide an extra seat for a second baby.

Another object of the present invention is to provide a stroller with car seat fastening arrangement, wherein no expensive or mechanical structure is required to employ in the present invention in order to achieve the above mentioned objects. Therefore, the present invention successfully provides an economic and efficient solution for providing reinforced fastening configuration for the car seat supported on the stroller.

Accordingly, in order to accomplish the above objects, the present invention provides a stroller with a car seat fastening arrangement, wherein the stroller comprises a stroller frame for substantially supporting a car seat having a fastening slot.

The car seat fastening arrangement comprises a holding belt, having a predetermined length, extended from the stroller frame and a connecting unit securely locked up the two ends of the holding belt to form a holding loop for encirclingly holding the car seat on the stroller frame through the fastening slot.

DETAILED DESCRIPTION OF THE PREFERRED EMBODIMENT

Figure 1:
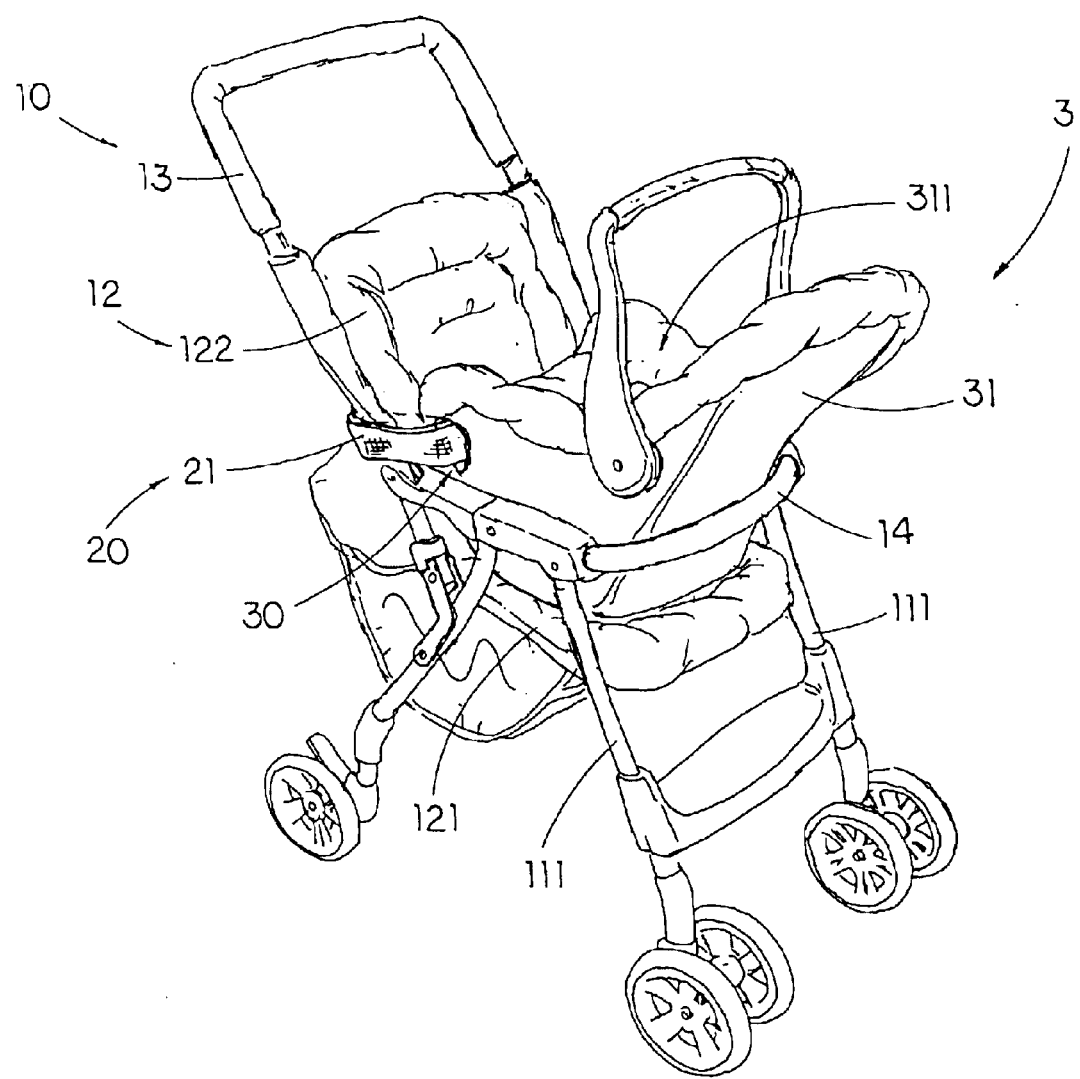
FIG. 1 is a perspective view of a stroller with car seat fastening arrangement according to a first preferred embodiment of the present invention, illustrating a car seat being mounted on the stroller.

Referring to FIG. 1 of the drawings, a stroller incorporated with a car seat fastening arrangement 20 according to a first preferred embodiment of the present invention is illustrated, wherein the stroller comprises a stroller frame 10 for substantially supporting a car seat 3 having a fastening slot 30.

The car seat fastening arrangement 20 comprises a holding belt 21, each having a predetermined length, extended from the stroller frame 10 and a connecting unit 23 securely locked up two ends of the holding belt 21 to form a holding loop for encirclingly holding the car seat 3 on the stroller frame 10 through the fastening slot 30.

According to the preferred embodiment, the stroller frame 10, such as an ordinary stroller frame, comprises a supporting frame 11 having two front frame legs 111, a regular seat 12 comprising a seat support 121 horizontally supported by the supporting frame 11 and a back support 122 upwardly extended from the seat support 121, and a handle frame 13 upwardly extended from the supporting frame 11. The stroller frame 10 further comprises a boundary frame 14 frontwardly extended from the supporting frame 11 so as to limit a frontward movement of the baby or a young child sat on the regular seat 12 wherein a receiving cavity 101, having a size adapted for substantially disposing the car seat 3 therein, is defined between the boundary frame 14 and the regular seat 12.

The car seat 3 comprises a car regular seat 31 having a supporting chamber 311 for substantially supporting a baby therein wherein a bottom portion of the bassinet frame 31 is adapted to be disposed in the receiving cavity 101 of the stroller frame 10. The fastening slot 30 is transversely provided on the car regular seat 31 for a seat belt of a car extended therethrough. It is worth to mention that every conventional car seat 3 must have the fastening slot 30 such that when the car seat 3 is placed in the car, the seat belt can be passed through the fastening slot 30 in order to fasten the car seat 3 on the seat of the car.

Figure 2:
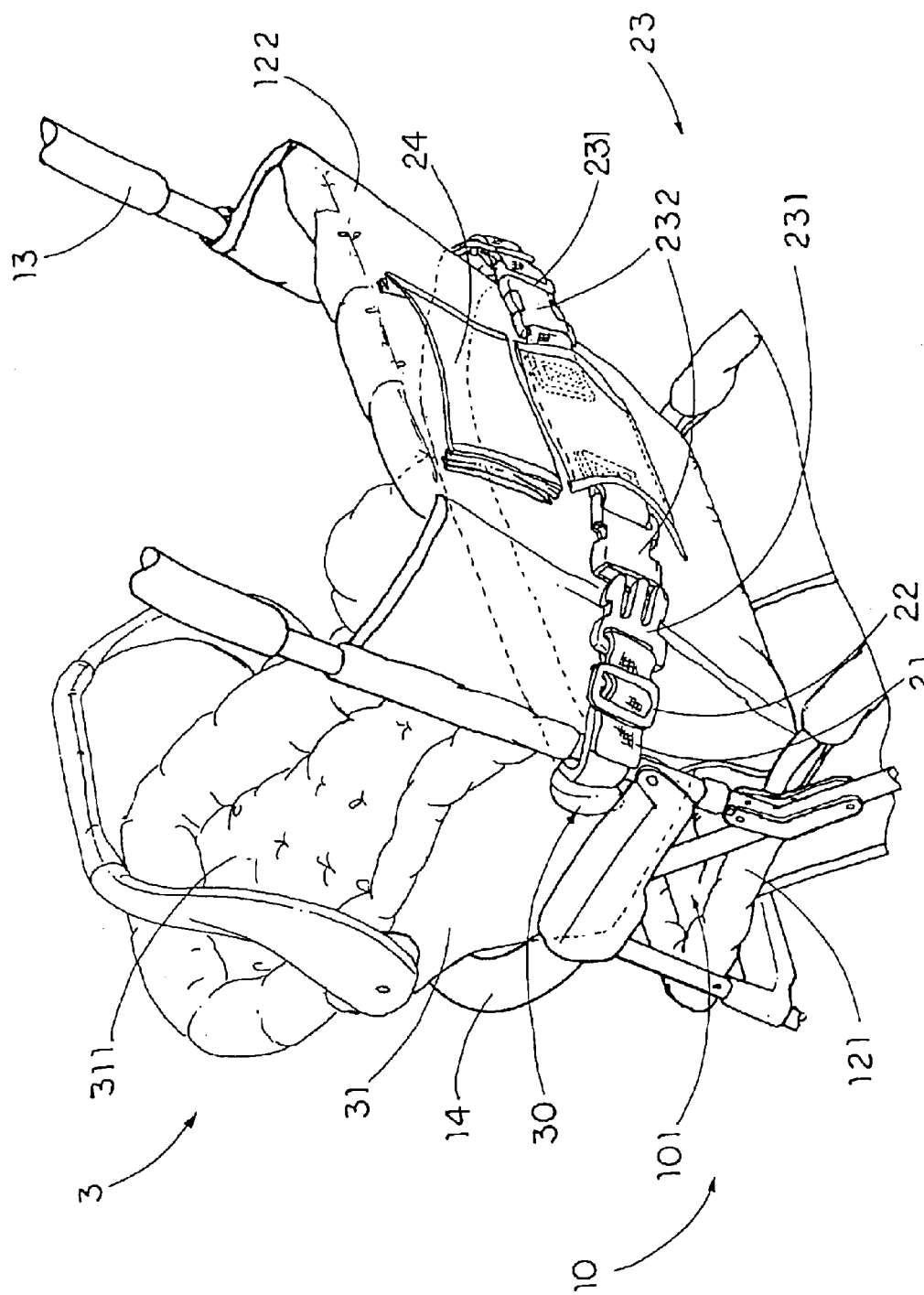
FIG. 2 is a perspective view of the car seat fastening arrangement of the stroller according to the first preferred embodiment of the present invention.

As shown in FIG. 2, the holding belt 21 has a length adapted to extend from one side portion of the back support 122 of the regular seat 12 to another opposed side portion of the back support 122 of the regular seat 12 through the fastening slot 30 of the car seat 3 when the car seat 3 is supported on the stroller frame 10.

In order to adjust the length of the holding loop of the holding belt 21, the car seat fastening arrangement 20 further comprises at least an adjusting member 22 having two slots for a free end portion of the holding belt 21 slidably entangled therethrough respectively so as to adjust a position of the adjusting member 22 along the holding belt 21. In other words, the length of the holding loop of the holding belt 21 can be selectively adjusted to fit any size of the car seat 3 on the vehicle frame 10.

The connecting unit 23 comprises two first connectors 231 provided at two free end portions of the holding belt 21 and two second connectors 232 provided at two side portions of a rear surface of the back support 122 of the regular seat 12 respectively wherein the first connectors 231 are adapted to securely engage with the second connectors 232 respectively so as to form the holding loop of the holding belt 21. Accordingly, the first and second connectors 231, 232 are a pair of buckle sockets and buckle plugs adjustably affixed to the free end portions of the holding belt 21 and firmly attached to the rear surface of the back support 122 of the regular seat 12 respectively.

As shown in FIG. 2, the car seat fastening arrangement 20 further comprises a belt pocket 24 provided at the rear side of the back support 122 of the regular seat 12 for storing the holding belt 21 when the holding belt 21 is detached. The belt pocket 24 is formed by a fabric flap having a three edges firmly affixed by stitching on the rear surface of the back support 122 while a top edge is remained open to form a top opening such that the holding belt 21 can be stored in the belt pocket 24 through the top opening.

It is worth to mention that the movement of the car seat 3 is restricted by the regular seat 12 and the boundary frame 14 within the receiving cavity 101, so as to prevent a lateral movement of the car seat 3 with respect to the stroller frame 10. Moreover, the holding belt 21 is extended to pass through the fastening slot 30 of the car seat 3 and then connected to the first connectors 231 with the second connectors 232 respectively, so as to lock up the upward movement of the car seat 3 with respect to the stroller frame 10. Besides, by selectively adjusting the length of the holding loop, any size of the ordinary car seat can be fittedly mounted on the stroller frame 10 in a secure manner.

Figure 3:
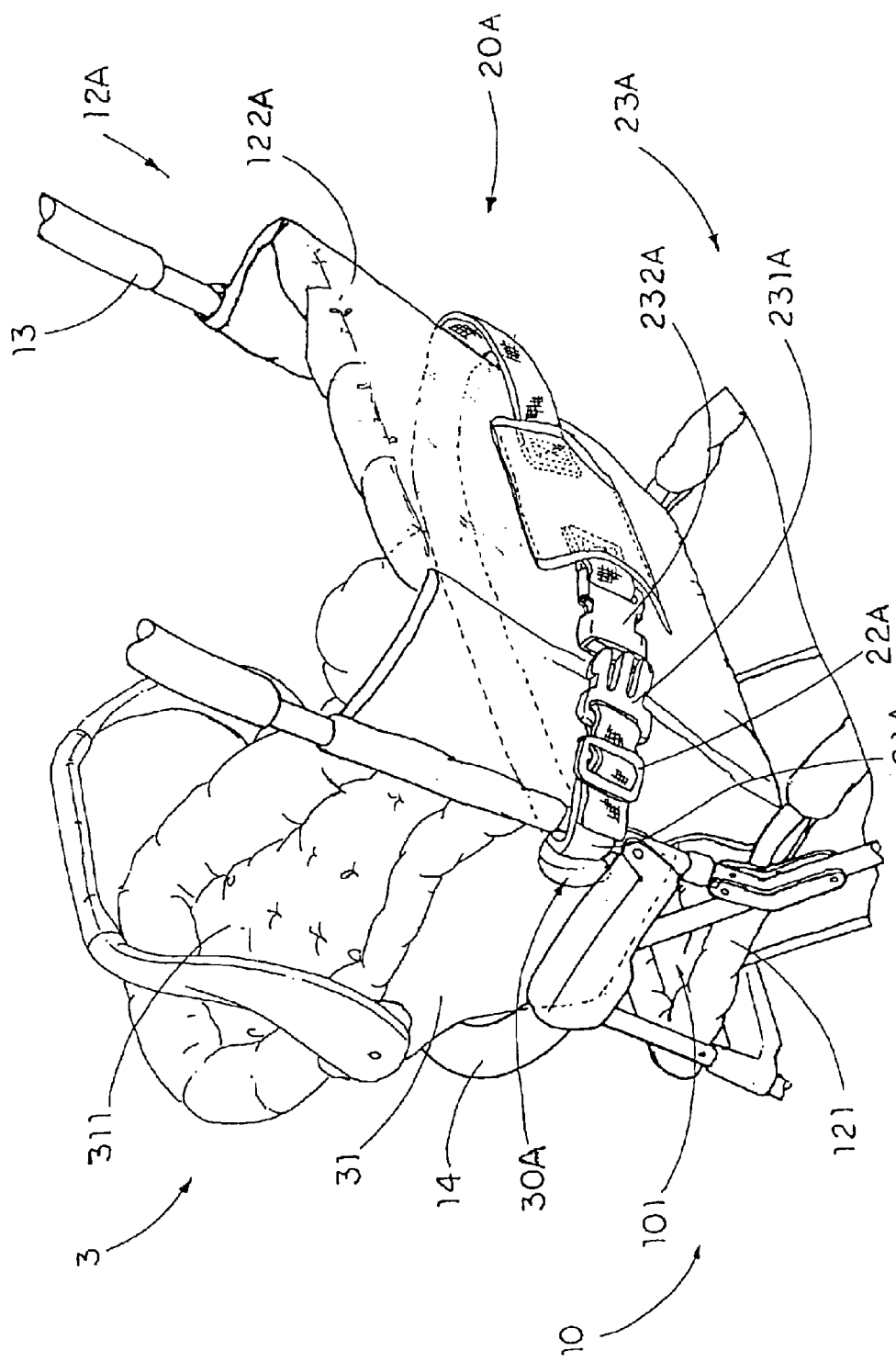
FIG. 3 illustrates an alternative mode of the car seat fastening arrangement of the stroller according to the first preferred embodiment of the present invention.

FIG. 3 illustrates an alternative mode of the car seat fastening arrangement 20A wherein the holding belt 21A has an affixing end extended from the rear side of the back support 122A of the regular seat 12A wherein the belt connector 231A of the connecting unit 23A is adjustably connected to a free end portion of the holding belt 21A in such a manner that the holding belt 21A is arranged for passing through the fastening slot 30A of the car seat 3A on the stroller and connected the belt connector 231A with the unit connector 232A of the connecting unit 23A provided at the rear side of the back support 122A. Thus, the length of the holding loop of the holding belt 21A can be selectively adjusted by the adjusting member 22A.

Figure 4:
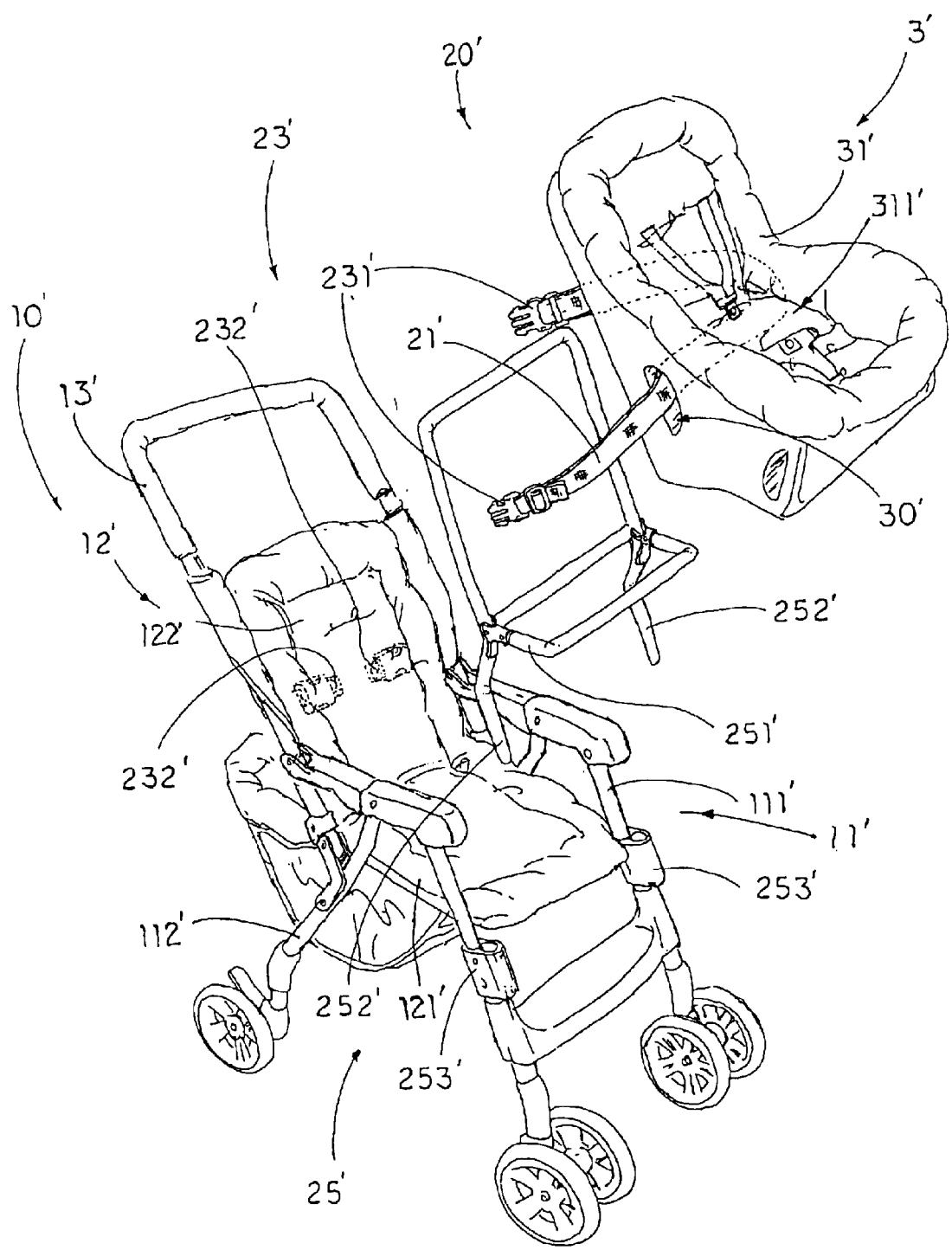
FIG. 4 is a perspective view of a stroller with car seat fastening arrangement according to the second preferred embodiment of the present invention.

Referring to FIG. 4, a second embodiment of the car seat fastening arrangement 20' illustrates an alternative mode of the first embodiment of the present invention, wherein the stroller' is capable of providing two seats for supporting an extra baby.

As shown in FIG. 4, the stroller comprises a supporting frame 11' having two front frame legs 111' and two back frame legs 112', a regular seat 12' comprising a seat support 121' horizontally supported by the supporting frame 11' and a back support 122' upwardly extended from the seat support 121', and a handle frame 13' upwardly extended from the supporting frame 11'.

The car seat 3' comprises a car regular seat 31' having a supporting chamber 311' for substantially supporting a baby therein, and a fastening slot 30' transversely extended from the car regular seat 31 ' for the seat belt of the car passing through.

The holding belt 21' has a length adapted to extend from one side portion of the back support 122' of the regular seat 12' to another opposed side portion of the back support 122' of the regular seat 12' through the fastening slot 30' of the car seat 3' when the car seat 3' is supported on the stroller frame 10'. The car seat fastening arrangement 20' further comprises at least an adjusting member 22' having two slots for a free end portion of the holding belt 21' slidably entangled therethrough respectively so as to adjust a position of the adjusting member 22' along the holding belt 21'.

The connecting unit 23' comprises two first connectors 231' provided at two free end portions of the holding belt 21' and two second connectors 232' provided at two side portions of a rear surface of the back support 122' of the regular seat 12' respectively wherein the first connectors 231' are adapted to securely engage with the second connectors 232' respectively so as to connect the holding belt 21' to form the holding loop of the holding belt 21'. Accordingly, the first and second connectors 231', 232' are a pair of buckle sockets and buckle plugs adjustably affixed to the free end portions of the holding belt 21' and firmly attached to the rear surface of the back support 122' of the regular seat 12' respectively.

Figure 5:
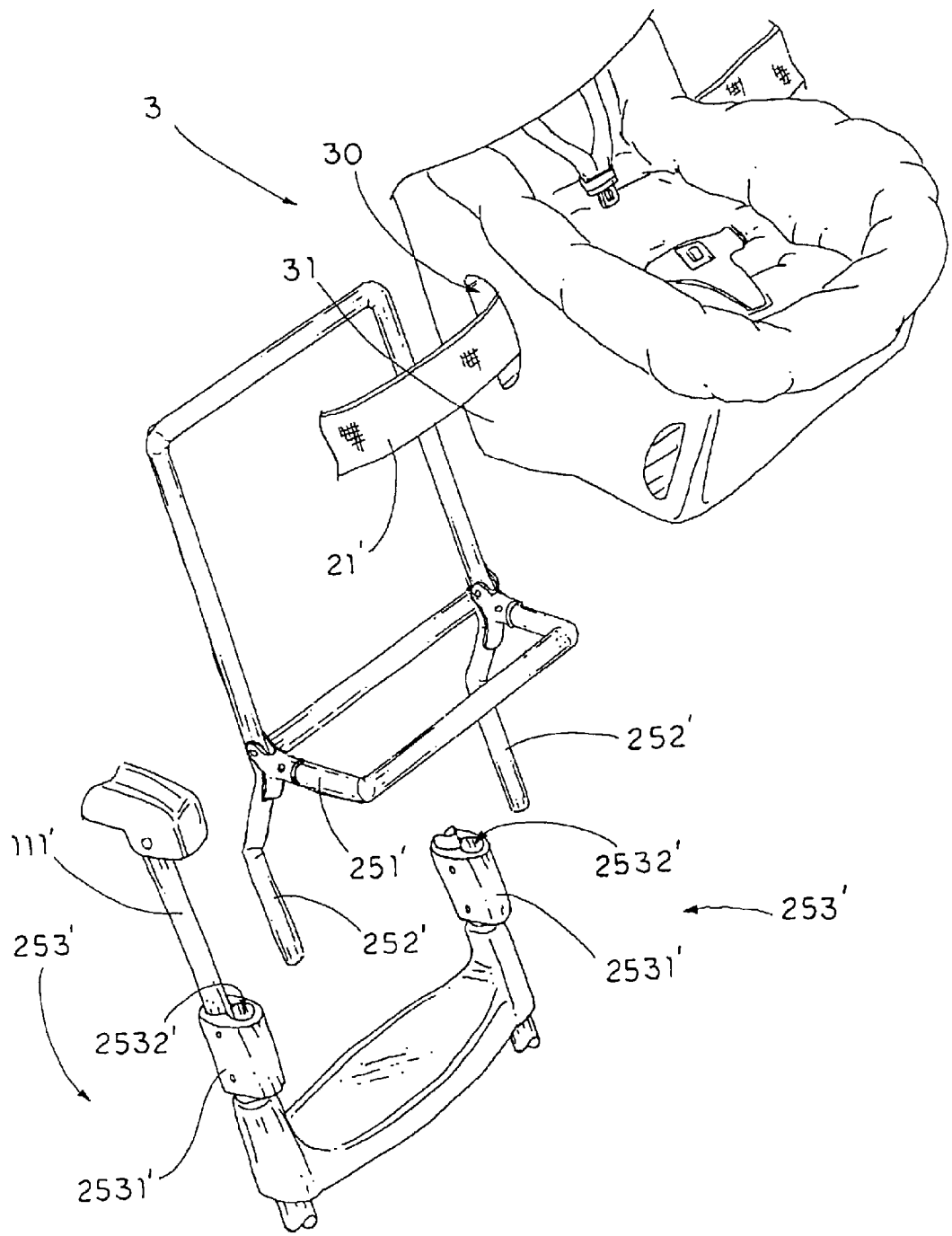
FIG. 5 is a perspective view of a tubular holder of the stroller with car fastening arrangement according to the second preferred embodiment of the present invention.

As shown in FIG. 5, the car seat fastening arrangement 20' further comprises a car seat adaptor frame 25' detachably mounted in front of the vehicle frame 10' and adapted for substantially supporting the car seat 3' thereon. The car seat adaptor frame 25' comprises a support frame 251' for substantially supporting the car seat 3' thereon, a pair of supporting frame legs 252' downwardly extended from the support frame 251', and a pair of tubular holders 253' provided on the two front frame legs 111' respectively such that the tubular holders 253' is adapted to detachably hold the two supporting frame legs 252' respectively so as to substantially mount the support frame 251' in front of the stroller frame 10'.

Each of the tubular holders 253' comprises a holder body 2531' affixed to the respective front frame leg 111' and having a holder socket 2532' which has a diameter slightly larger than the supporting frame leg 252' and vertically extended to the holder body 2531' for an end portion of the supporting frame leg 252' slidably inserting thereinto, as shown in FIG. 5.

Figure 6:
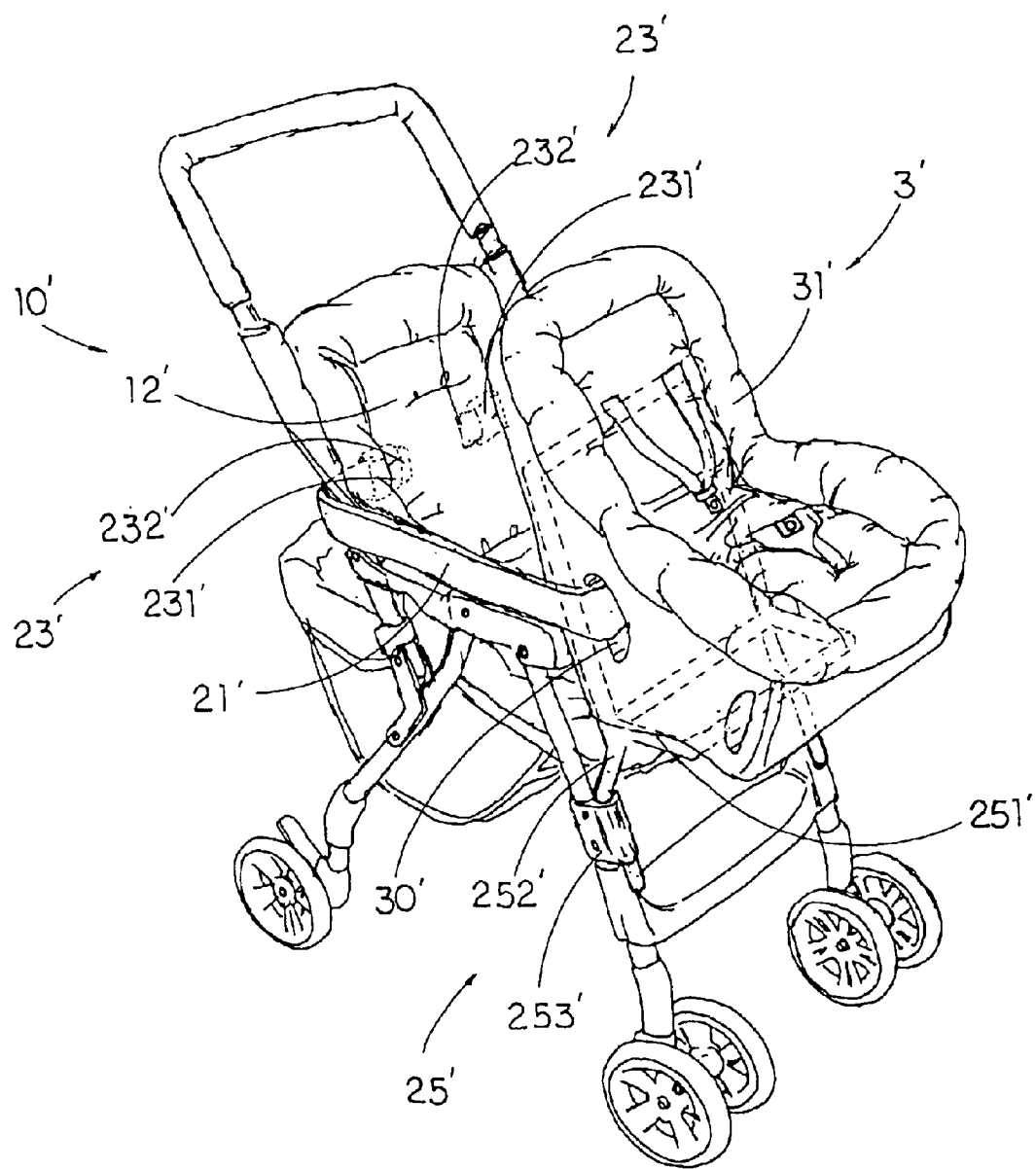
FIG. 6 is a perspective view of the stroller with car seat fastening arrangement according to the second preferred embodiment of the present invention, illustrating the car seat being mounted on the stroller.

In other words, the stroller can provide two seats when the car seat 3' is mounted in front of the stroller. Thus, the car seat 3' can be securely mounted on the stroller' by inserting the supporting frame legs 252' into the tubular holders 253' respectively and fastening by the holding belt 21' with the connecting unit 23', as shown in FIG. 6.

What is claimed is:

1. A stroller adapted for securely supporting a car seat which has a fastening slot of a securing arrangement for a seat belt of a vehicle to fasten in position, comprising:

a stroller frame comprising a supporting frame having two front frame legs, a boundary frame frontwardly extended from said supporting frame and a handle frame upwardly extended from said supporting frame;

a regular seat comprising a seat support horizontally supported by said supporting frame and a back support upwardly extended from a rear portion of said seat support, wherein a receiving cavity, having a size adapted for substantially disposing said car seat therein, is formed between said boundary frame and said regular seat; and a car seat fastening arrangement comprising:

a connecting unit provided at a rear side of said back support of said regular seat, wherein said connecting unit comprises at least a unit connector; and a holding belt having a first end connected to said connecting unit and a second end affixed with a belt connector detachably fastened with said unit connector to form a holding loop having a size enough for encirclingly holding said car seat on said stroller through said fastening slot of said car seat to retain said car seat on said stroller at a position that a baby or a young child sat on said car seat is facing rearward.

2. The stroller, as recited in claim 1, further comprising a buckle plug affixed to said second end of said holding belt and a buckle socket provided at said unit connector to detachably connect with said buckle plug so as to form said holding loop of said holding belt for securing with said car seat.

3. The stroller, as recited in claim 1, wherein said car seat fastening arrangement further comprises means for selectively adjusting said size of said holding loop of said holding belt for tightly holding said car seat with said stroller frame.

4. The stroller, as recited in claim 2, wherein said car seat fastening arrangement further comprises means far selectively adjusting said size of said holding loop of said holding belt for tightly holding said car seat with said stroller frame.

5. The stroller, as recited in claim 3, wherein said adjustment means comprises at least an adjusting member coupled on said holding belt to selectively lock up said belt connector at a position along said holding belt such that said size of said holding loop is adjusted when said length of between said belt connector and said first end of said holding belt is adjusted.

6. The stroller, as recited in claim 4, wherein said adjustment means comprises at least an adjusting member coupled on said holding belt to selectively lock up said belt connector at a position along said holding belt such that said size of said holding loop is adjusted when said length of between said belt connector and said first end of said holding belt is adjusted.

* * * * *